United States Patent
Ranganathan et al.

(10) Patent No.: US 7,769,947 B2
(45) Date of Patent: Aug. 3, 2010

(54) MANAGEMENT OF DATA REDUNDANCY BASED ON POWER AVAILABILITY IN MOBILE COMPUTER SYSTEMS

(75) Inventors: Sriram Ranganathan, Bangalore (IN); Brian A. Leete, Beaverton, OR (US); Francis Corrado, Newton, MA (US)

(73) Assignee: Intel Corporation, Santa Clara, CA (US)

( * ) Notice: Subject to any disclaimer, the term of this patent is extended or adjusted under 35 U.S.C. 154(b) by 255 days.

(21) Appl. No.: 11/240,754

(22) Filed: Sep. 30, 2005

(65) Prior Publication Data

US 2007/0079067 A1     Apr. 5, 2007

(51) Int. Cl.
G06F 12/00 (2006.01)
G06F 13/00 (2006.01)
G06F 13/28 (2006.01)
G06F 1/00 (2006.01)
G06F 1/26 (2006.01)
G06F 1/32 (2006.01)

(52) U.S. Cl. .................. 711/114; 711/154; 711/161; 711/162; 713/300; 713/320; 713/324

(58) Field of Classification Search .................. 711/114
See application file for complete search history.

(56) References Cited

U.S. PATENT DOCUMENTS 6,266,776 B1 *  7/2001  Sakai ....................... 713/300
2002/0023198 A1 *  2/2002  Kokubun et al. ............ 711/162
2004/0179386 A1  9/2004  Jun
2004/0243858 A1 * 12/2004  Dennis et al. .............. 713/300
2005/0108586 A1 *  5/2005  Corrado et al. ............. 713/320
2007/0050544 A1  3/2007  Chawla et al.
2007/0146788 A1  6/2007  Shinozaki et al.
2009/0006745 A1  1/2009  Cavallo et al.

OTHER PUBLICATIONS

Office Action received for U.S. Appl. No. 11/823,857, mailed on Sep. 17, 2009; 11 pgs.
Massiglia, P., "The Raid Book, A Storage System Technology Handbook", 6th Editions, RAID Advisory Board, Feb. 1997; 159 pgs.
Final Office Action received for U.S. Appl. No. 11/823,857, mailed on Apr. 15, 2010, 11 pages.

* cited by examiner

Primary Examiner—Christian P Chace
Assistant Examiner—Ryan Bertram
(74) Attorney, Agent, or Firm—Grossman, Tucker, Perreault & Pfleger, PLLC

(57) ABSTRACT

Disclosed herein are methods that may be implemented in a mobile computer system. An exemplary method may include initiating a split of a storage volume of the mobile computer system. The storage volume may comply with a fault tolerant storage technology. Suitable technologies include, but are not limited to, those based on Redundant Array of Independent (or Inexpensive) Disks (RAID). In one aspect, the initiation of the split of the storage volume may be based, at least in part, on power availability. Then, a reduction of a power consuming state of a first storage device of the volume may be initiated.

17 Claims, 7 Drawing Sheets

MANAGEMENT OF DATA REDUNDANCY BASED ON POWER AVAILABILITY IN MOBILE COMPUTER SYSTEMS

BACKGROUND

1. Field

Embodiments of the invention relate to mobile computer systems. In particular, embodiments of the invention relate to power management in mobile computer systems.

2. Background Information

Mobile computer systems, such as, for example, laptops, may be powered using alternating current from an outlet or electricity from a battery. Since the electricity available from batteries is limited, it is sometimes appropriate to conserve battery power.

RAID (Redundant Array of Independent (or Inexpensive) Disks), may be used in laptops to store redundant data and thereby achieve fault tolerance. However, RAID generally involves storing data on two or more hard disks included in the laptop.

Since each hard disk may consume a significant amount of electricity, implementing RAID may significantly diminish the period of time during which the laptop may be operated by using power from the battery.

BRIEF DESCRIPTION OF THE SEVERAL VIEWS OF THE DRAWINGS

The invention may best be understood by referring to the following description and accompanying drawings that are used to illustrate embodiments of the invention. In the drawings.

DETAILED DESCRIPTION

In the following description, numerous specific details are set forth. However, it is understood that embodiments of the invention may be practiced without these specific details. In other instances, well-known circuits, structures and techniques have not been shown in detail in order not to obscure the understanding of this description.

Figure 1:
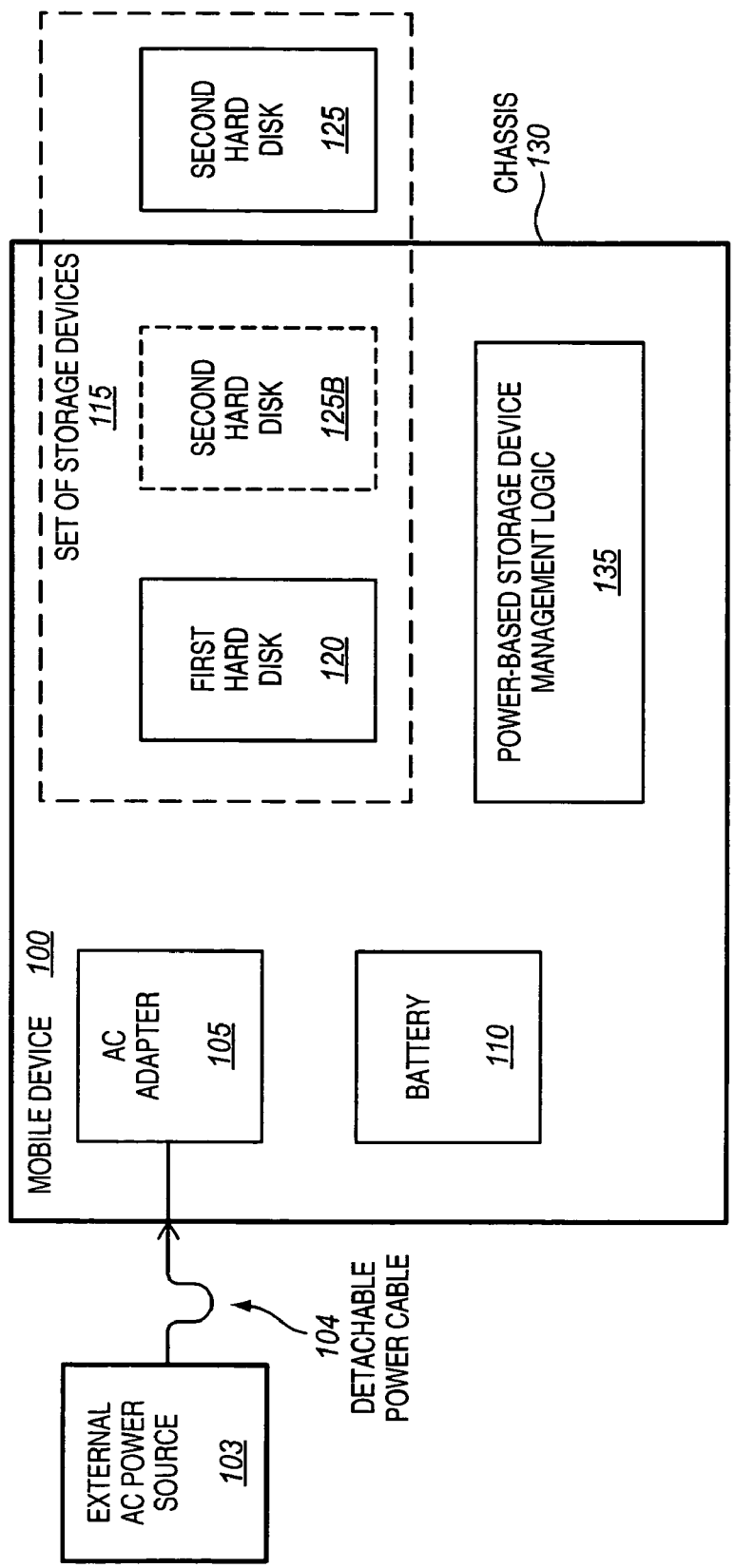
FIG. 1 is a block diagram of a mobile computer system, according to one or more embodiments of the invention.

FIG. 1 is a block diagram of a mobile computer system 100, according to one or more embodiments of the invention. In various embodiments of the invention, the mobile computer system may include, but is not limited to, a laptop computer (also known as a notebook computer), a sub-notebook computer, a desktop/notebook computer, a palmtop computer, or a personal digital assistant.

The laptop computer or other mobile computer system includes an alternating current (AC) adapter 105 and a battery 110. Suitable batteries include, but are not limited to, lithium ion batteries and nickel metal-hydride batteries. As used herein, a battery pack may be referred to as a battery. An exemplary battery includes a pack of twelve cell lithium ion batteries. The mobile computer may also optionally include more than one battery. Further, in one or more alternate embodiments of the invention, the battery may be replaced by a fuel cell, wind-up mechanism, or like direct current and/or finite power storing device. In different modes of operation, the mobile computer system may be powered primarily by the AC power source and AC adapter, or primarily by the battery or other direct current power source.

In one mode, the AC adapter of the mobile computer system may be coupled with an external AC power source 103 via a detachable power cable 104 so that the mobile computer system may receive electricity primarily from the AC power source. In the description and claims, the terms "coupled" and "connected," along with their derivatives, may be used. It should be understood that these terms are not intended as synonyms for each other. Rather, in particular embodiments, "connected" may be used to indicate that two or more components are in direct physical or electrical contact with each other. "Coupled" may mean that two or more components are in direct physical or electrical contact. However, "coupled" may also mean that two or more components are not in direct contact with each other, but yet still co-operate or interact with each other. For example, two or more components may be coupled with one another via one or more intervening components. In addition, two or more components may be in communication with one another if they exchange data or information, regardless of whether they are in direct contact or not. Suitable AC power sources include, but are not limited to, power outlets to main power, electrical generators, and the like. The AC power source generally represents a plentiful source of electricity.

In another mode, the AC adapter may be decoupled from the AC power source, for example by detaching the cable from the mobile device, the AC power source, or both, so that the mobile computer system may receive power from the battery. The battery generally has a limited amount of electricity in the form of stored chemical potential, which is available to power the mobile computer system. By way of example, a battery may power a laptop computer for a period of time that is on the order of at least one hour, at least two hours, at least four hours, or more, depending upon the particular battery and laptop. In any event, the battery generally represents a less than plentiful source of power, such that conservation of power may offer certain advantages, such as, for example, the ability to operate the mobile computer system for a longer period of time without needing to recharge the battery.

Often, the battery (or a fuel cell or wind-up mechanism) may be used for power when the user is relatively more mobile and/or not in the proximity of the AC power source, whereas the AC power may be used when the user is relatively more stationary and/or in the proximity of the AC power source. However, the scope of the invention is not limited in this respect.

Referring again to FIG. 1, the mobile computer system further includes a set of storage devices 115. As shown in the illustrated embodiment, the set of storage devices may include a first hard disk 120 and a second hard disk 125, although the scope of the invention is not limited in this respect.

As shown, a subset of the storage devices, such as, for example, the first hard disk, may be internal to a chassis or housing 130. Another subset of the storage devices, such as, for example, the second hard disk, may be external to the chassis or housing. As one example, an external storage device may be included in a docking station with which the mobile computer system may be removably coupled. As another example, the external storage device may be peripheral and may be coupled with the mobile computer system by serial advanced technology attachment (SATA), a Universal Serial Bus (USB), or like communications standards. Remote mirroring is possible in which one of the mirrors is connected via a network. Such external storage device may be left behind when the mobile computer system is in mobile, which may tend to make the mobile computer system lighter. As yet another example, the external storage device may be included in a removable storage device drive that may be inserted into and removed from a storage device drive bay or swap bay within the chassis or housing. Accordingly, one or more storage devices of the set may be removably coupled or intermittently coupled with the mobile computer system. These are just a few examples, and the scope of the invention is not limited to just these examples. Alternatively, as shown by the dashed lines, the second hard disk 125B or other storage device may alternatively be included within the chassis or housing, although this may tend to increase the size or thickness of the mobile computer system. As used herein, the term RAID (Redundant Array of Independent (or Inexpensive) Disks) includes, but is not limited to, technology to store data with redundancy on all of such exemplary configurations or architectures.

Furthermore, the scope of the invention is not limited to just two storage devices. The set may also optionally include more than two storage devices, such as, for example, three or more storage devices. As another option, storage devices other than hard disks, such as, for example, magnetic tape cassettes, flash memory cards, digital versatile disks, digital video tape, CD-ROM (compact disk read only memory), solid state RAM (random access memory), solid state ROM, and the like, as well as other known storage devices, and combinations thereof, may optionally be used.

In one or more embodiments of the invention, the set of storage devices may collectively form a storage volume. The storage volume may represent a concatenation of potentially heterogeneous storage elements that may be used to store data. The storage volume may comply with and store data according to one or more fault tolerant storage technologies or protocols or data redundancy storage technologies or protocols. Suitable technologies or protocols include, but are not limited to, various RAID technologies or protocols.

One exemplary suitable RAID technology is RAID-1. RAID-1 may utilize mirroring of data on two or more hard disks or other storage devices. In other words, identical copies of data may be duplicated or stored on the two or more hard disks or other storage devices. For example, a set of data may be stored on the first hard disk and an identical copy of the set of data may be stored on the second hard disk. The first and the second hard disks may form a RAID-1 storage volume. Such mirroring or duplication of data provides data redundancy and may offer fault tolerance. For example, if one of the hard disks is damaged or otherwise fails, the identical set of data may be retrieved from the other hard disk. It is possible to have many more than two mirrored copies, and hardware reliability tends to increase proportionally to, such as, for example, a linear multiple of, the number of mirrored copies. Generally in RAID-1 mirroring of identical sets of data on the storage devices is performed unless one of the storage devices experiences a hardware failure.

Figure 2:
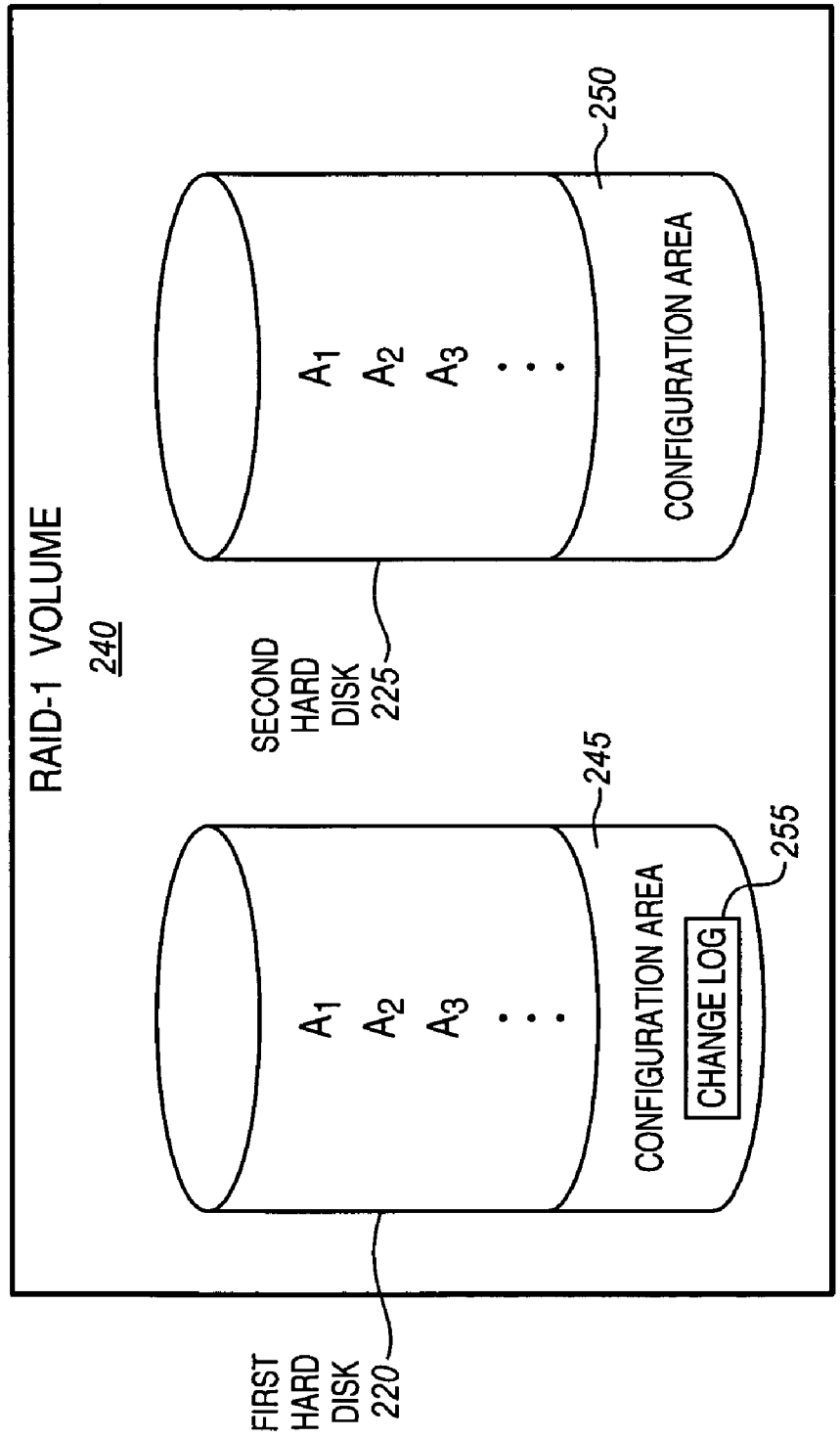
FIG. 2 is a block diagram of a RAID-1 volume, according to one or more embodiments of the invention.

FIG. 2 is a block diagram of a RAID-1 volume 240, according to one or more embodiments of the invention. The RAID-1 volume includes a first hard disk 220 and a second hard disk 225. Both the first and the second hard disks store identical sets of data. In particular, both the first and the second hard disks store A1, A2, A3, and potentially other data, where A1, A2, and A3 may represent blocks or other quantities of data. As shown, in one or more embodiments of the invention, the first hard disk may have a first configuration area 245, and the second hard disk may have a second configuration area 250. As further shown, a change log 255, in accordance with one or more embodiments of the invention, may be stored in at least the first configuration area. Configuration areas and change logs will be discussed further below.

RAID-10 and RAID-01 also use versions of mirroring and are suitable. Other levels of RAID, such as, for example, RAID-5, may also optionally be used. RAID-5 may utilize three or more hard disks. These other levels may use other forms of data redundancy besides mirroring, such as, for example, parity. Various levels of RAID other than RAID-1 often involve using more then two storage devices.

Now, a set of storage devices, such as, for example, two hard disks, may consume more power during operation than a subset of storage devices, such as, for example only one hard disk. As described above, battery power may be limited.

Referring again to FIG. 1, the mobile computer system includes power-based storage device management logic 135. The power-based storage device management logic may manage storage devices and/or storage of redundant data based at least in part on power availability. The software may take the form of programs, program modules, routines, objects, components, or other sequences of instructions, as well as data structures, and combinations data structures and such sequences of instructions.

The logic may assist with managing the set of storage devices based, at least in part, on power availability. For example, the management of the storage devices may be based, at least in part, on whether the battery (or other direct current power source) or the AC power source is the principal source of power for the mobile computer system. As discussed further below, in one or more embodiments of the invention, power consuming states of one or more storage devices may be reduced when power is less than plentiful and only a subset of remaining storage devices may be used to store data. As further discussed, in one or more embodiments, the methods and apparatus disclosed herein may be used to intelligently balance or select levels of data redundancy or fault tolerance based on power availability.

Figure 3:
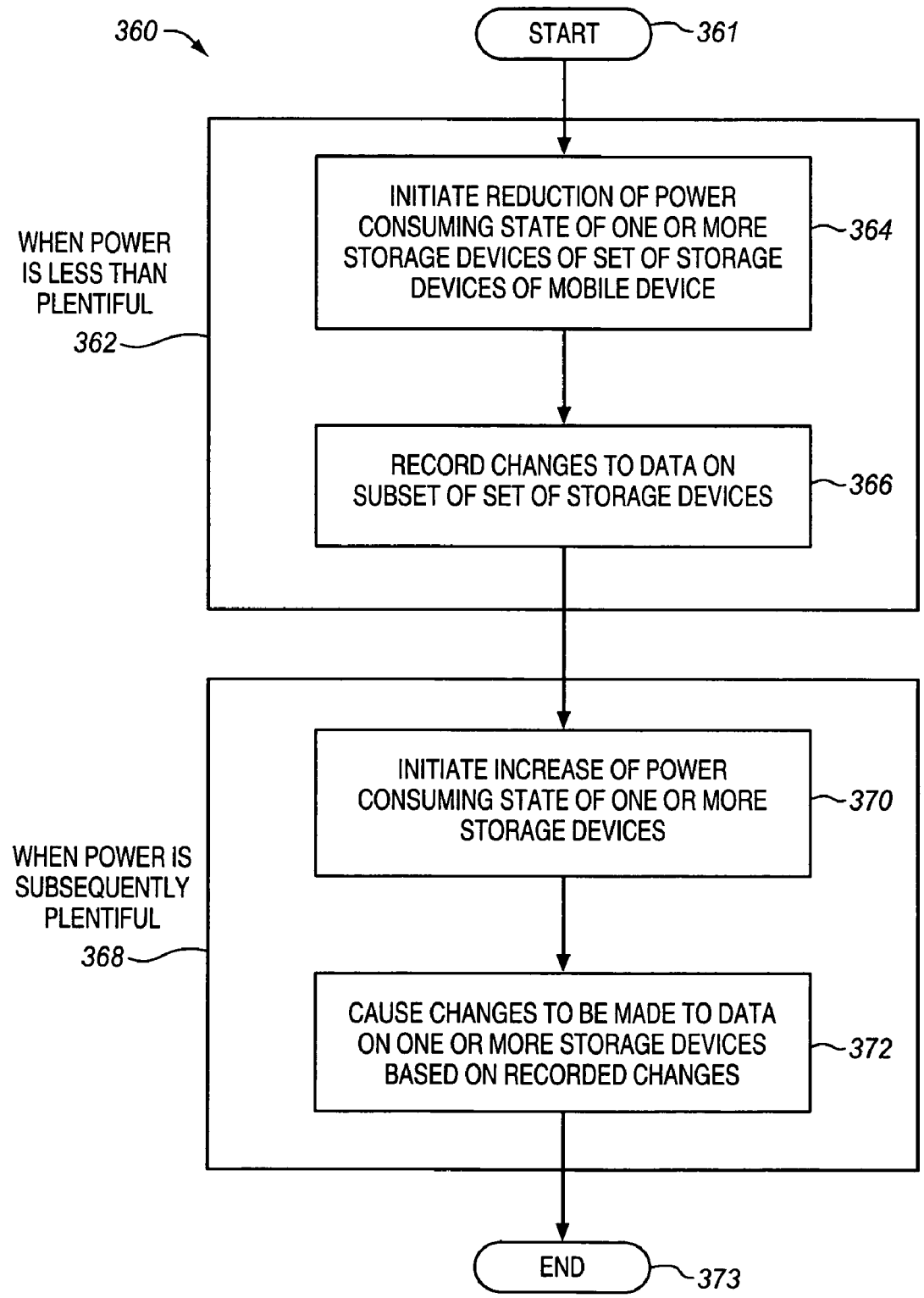
FIG. 3 is a flow diagram of a method of power-based management of storage devices of laptop computers and other mobile devices, according to one or more embodiments of the invention.

FIG. 3 is a flow diagram of a method 360 of power-based management of storage devices of laptop computers and other mobile devices, according to one or more embodiments of the invention. The method, or portions of the method, may be implemented by the power-based storage device management logic.

In one or more embodiments of the invention, the mobile computer system may implement operating system assisted or directed power management. In such embodiments, the power-based storage device management logic as disclosed herein may either be incorporated or integrated with a power-aware operating system, or may be separate from the power-aware operating system but may communicate with and cooperate with the power-aware operating system to cause the operating system to implement one or more of the operations or methods as disclosed herein, such as, for example, putting a hard disk into a reduced power consuming state and/or increasing a power consuming state of a hard disk. In one aspect, optional pre-operating system software may be included to perform functions such as designate a boot disk, mounting a drive as an independent drive, and the like.

Initially, at block 362, power may be, or may become, less than plentiful. For example, a device such as a battery or other direct current power source, which has a limited amount of electricity, may be used primarily to power the mobile device. In one aspect, the mobile device may be powered on without first coupling the AC adapter with the external AC power source so that the mobile device is powered with power from the battery. In another aspect, the AC adapter may be decoupled from the AC power source during operation of the mobile device so that the battery may then be the primarily source of power for the mobile device.

In response to the power becoming less than plentiful, or at least after the power becomes less than plentiful, a series of operations of the method may be performed. As shown at block 364, a reduction of a power consuming state of one or more storage devices of a set of storage devices of the mobile device may be initiated and then implemented. In one or more embodiments of the invention, a RAID-1 volume or mirror, or other storage volume, may first be split. This is sometimes referred to as breaking the RAID-1 mirror. In splitting the RAID-1 volume, one or more storage devices may be identified as active, and one or more other storage devices may be identified as inactive. Then one or more inactive storage devices may be put into standby, put into hibernation, put to sleep, or otherwise put into a reduced power consuming state. In one or more embodiments of the invention, a device may be transitioned from an operating state, such as, for example, an Advanced Configuration and Power Interface (ACPI) D0 state, to a standby state, such as, for example, an ACPI D1 state, by issuing a standby command. As another option, a device may be transitioned from an operating or standby state to a sleep state, such as, for example, an ACPI D3 state by issuing a sleep command. In an exemplary standby state, the disk or platter may be stopped from spinning by turning off the motor that spins the disk. Reducing the power consuming state of the storage devices may allow the computer system to operate for a longer period of time using power from the battery or other direct current power source. Accordingly, in one aspect, mirroring may be discontinued based at least in part on a change in availability of power.

During subsequent operation of the mobile device, while the power remains less than plentiful, data on a subset of the active storage devices that are in operation may be changed, such as, for example, as the user uses applications to change data through writes, etc. The changes may be recorded, as shown at block 366. In one or more embodiments of the invention, the changes may be recorded in a change log, such as, for example, a data structure or a file.

Figure 4:
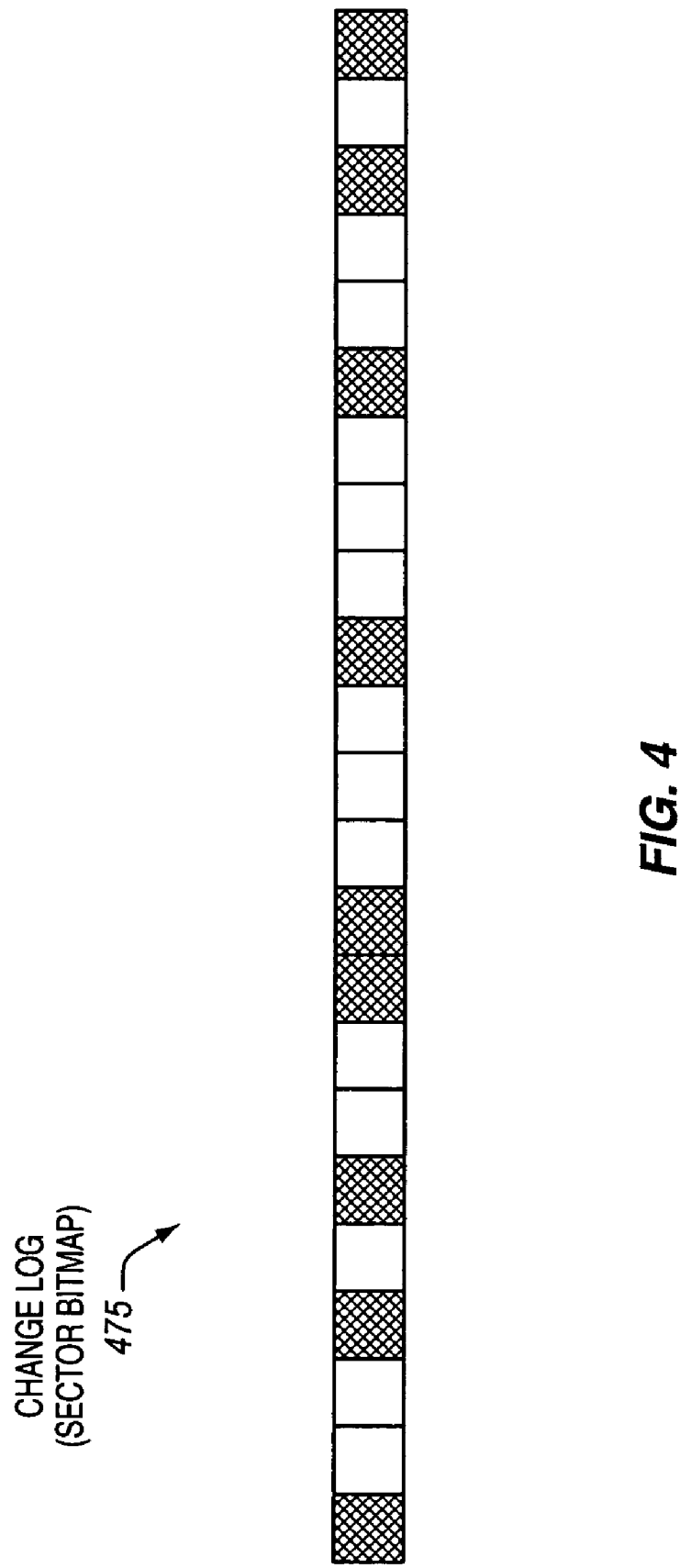
FIG. 4 shows an exemplary change log that may be used to record changes to sectors of a hard disk, according to one or more embodiments of the invention.

FIG. 4 shows an exemplary change log 475 that may be used to record changes to sectors of a hard disk, according to one or more embodiments of the invention. The illustrated change log is a sector bitmap. The sector bitmap is a data structure that may be stored on a machine-readable medium, such as, for example, a hard disk, and may be accessed by the power-based storage device management logic of the mobile device.

The illustrated sector bitmap includes an array of bits. In the illustration, each of the squares may correspond to a bit. Each bit of the array may correspond to a different sector or other portion of the hard disk or other storage device. Each sector may include about 512 bytes. Alternatively, rather than each bit corresponding to a sector, each bit may optionally correspond to a larger portion of the storage device, such as, for example, a plurality of adjacent sectors. Making each bit correspond to more than a sector may help to reduce the size of the bitmap.

The value of each bit, either zero or one, may indicate whether or not data writes or other changes have been made to the sector or other portion of the storage device that corresponds to the bit. In the illustration, by convention, each of the filled or solid squares represents a bit value of one, and each of the un-filled squares represents a bit value of zero. According to one possible convention, a bit value of zero may indicate that changes have not been made to the sector, whereas a bit value of one may indicate that changes have been made to the sector. This is just one possible convention, and the scope of the invention is not limited to just this particular convention.

Figure 5:
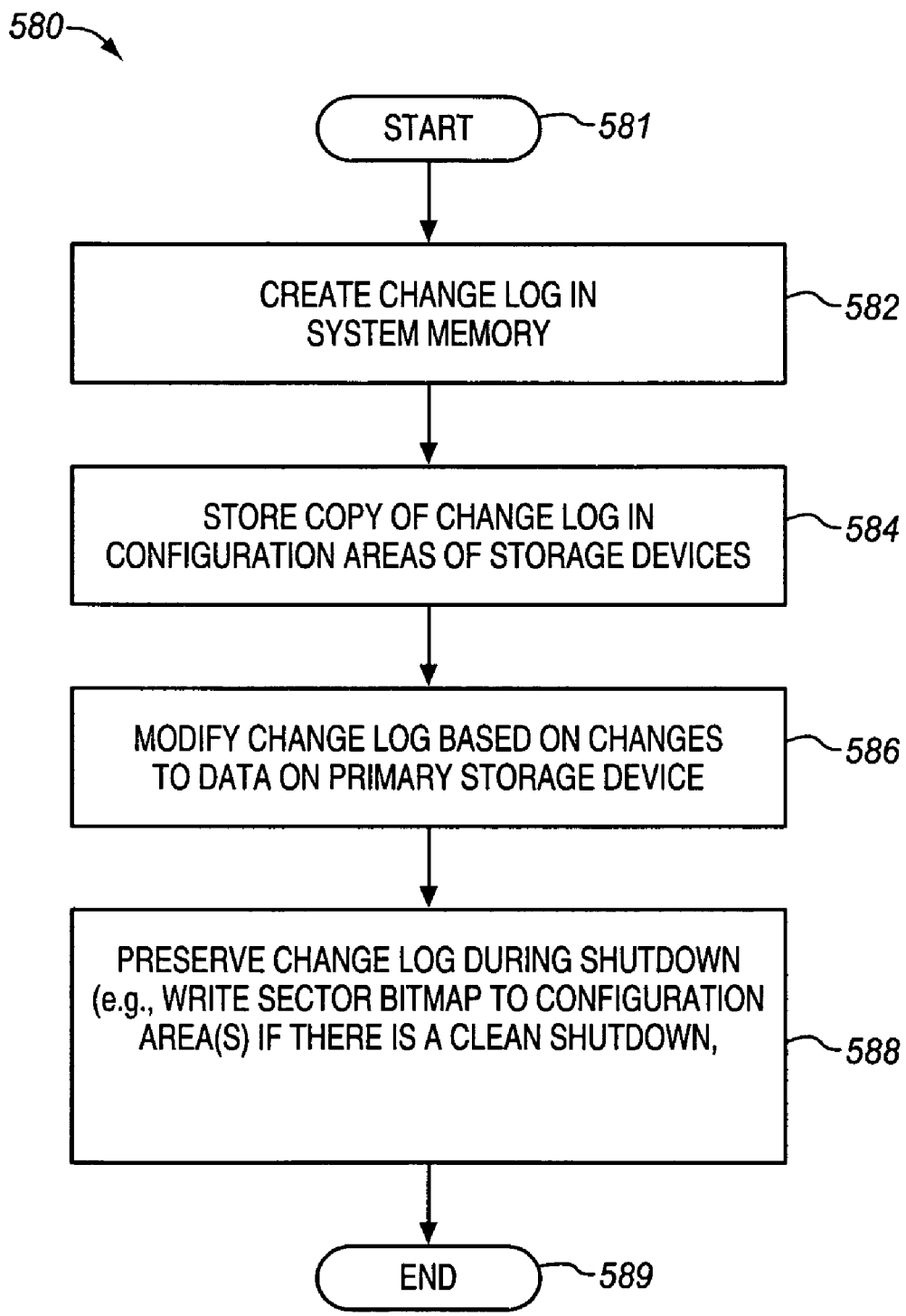
FIG. 5 is a flow diagram of a method of managing a change log, according to one or more embodiments of the invention.

FIG. 5 is a flow diagram of a method 580 of managing a change log, according to one or more embodiments of the invention. After initiating at block 581, a change log may be created, loaded, or otherwise provided in system memory, at block 582. Keeping the change log in system memory rather than on the hard disk during operation may offer advantages such as, for example, reduced number of writes.

Then, a copy of the sector bitmap or other change log may be stored in one or more configuration areas of one or more primary storage devices that are to remain in operation, at block 584. Configuration areas may have been previously created on each of the storage devices (see for example FIG. 2). Other persistent information pertaining to the storage volume may also optionally be stored in the configuration areas.

Next, the change log may be modified based, at least in part, on changes to data on an active, awake, primary storage device, at block 586. For example, when changes to data on the primary hard disk are made, such as, for example, when write requests are issued to the primary hard disk, software capable of managing the change log may determine which sector(s) or other portion(s) of the primary hard disk is going to be written to, and may modify the change log, such as, for example, by setting one or more bits corresponding to the sector(s) or other portions(s) to indicate that they are being changed. Such modifications may be made throughout operation of the device until regeneration of the RAID volume or other storage volume or shutdown occurs.

During a clean shutdown, the change log may optionally be preserved, as shown at block 588. In one or more embodiments of the invention, preserving the change log may include writing the change log to configuration area(s) of one or more of the storage devices when there is a clean shutdown. During operation, until the clean shutdown, the change log may be preserved in system memory. Keeping the change log in system memory, such as, for example, DRAM, rather than on the hard disk may avoid a significant increase in the number of writes to the hard disk and associated decrease in performance. Accordingly, the change log may be maintained in system memory for efficiency, and stored in the configuration area prior to normal system shutdown. Then, when power is subsequently restored, the change log may be read from the configuration area back to system memory. The method may then terminate at block 589.

Referring again to FIG. 3, at some later time, as shown at block 368, power may become plentiful, or at least more plentiful. For example, the AC adapter may be coupled with the external AC power source so that the battery no longer needs to be the principal source of power for the mobile computer system. As another example, the mobile computer system may be coupled with a docking station that may provide power.

In response to the power becoming plentiful or more plentiful, or at least after the power becomes plentiful or more plentiful, a series of operations of the method may be performed. As shown at block 370, an increase in the power consuming state of the one or more storage devices of the mobile device may be initiated and then implemented. As discussed above, in one or more embodiments of the invention, the power-based storage device management logic may initiate the increase, and the power-aware operating system may implement the increase, although the scope of the invention is not limited in this respect. By way of example, the one or more hard disks may be transitioned from a standby and/or sleep state to an operative state. Since the power is more plentiful, there is sufficient power for the full set of storage devices, and there is no need for them to remain in standby or sleep.

Then, after increasing the power consuming state of the one or more storage devices, while the power is still plentiful, changes to the data on the one or more storage devices may be caused to be made, and may be made, based, at least in part, on the previously recorded changes to the data on the subset of the storage devices, at block 372. In one or more embodiments of the invention, the changes may reform the set of storage devices into a storage volume that may be used to store data according to one or more fault tolerant or data redundancy storage protocols or technologies. For example, in one or more embodiments of the invention, the set of storage devices may be reformed into a RAID-1 volume based on the recorded changes. The method may then end, at block 373.

Figure 6:
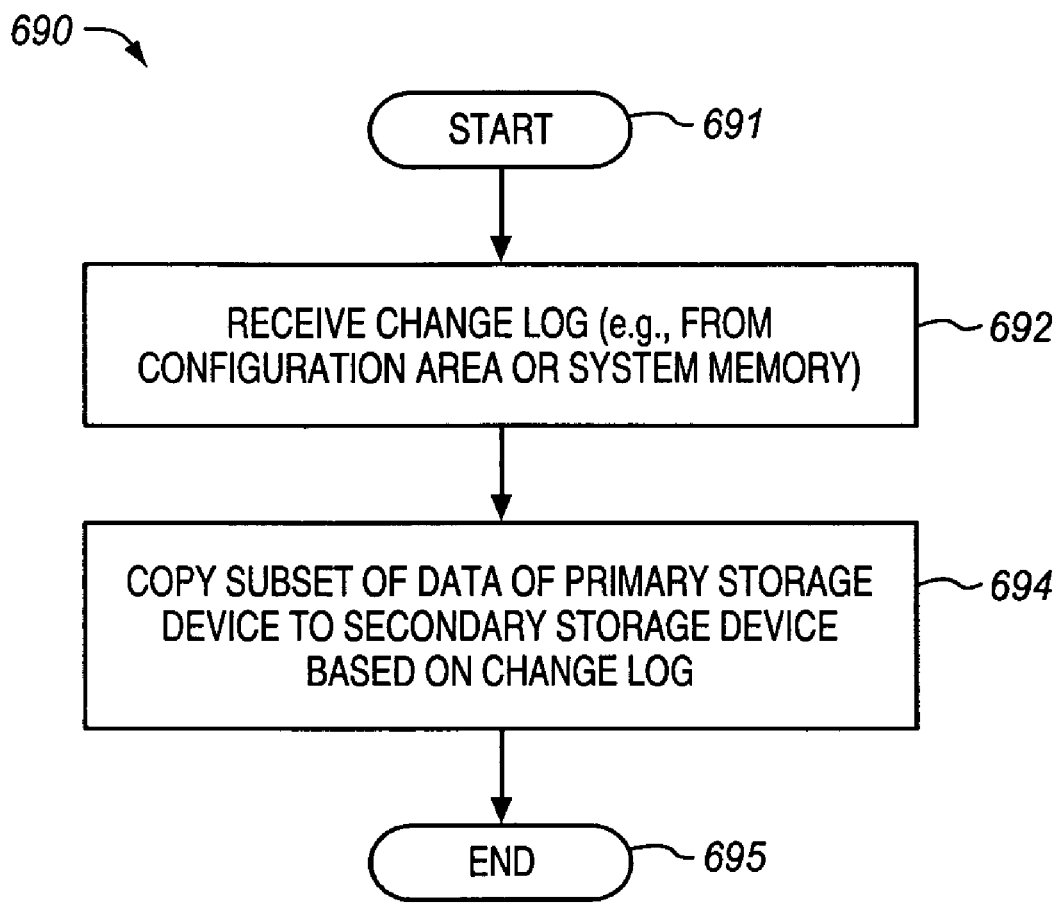
FIG. 6 is a flow diagram of a method of using a change log to rebuild a RAID-1 volume, according to one or more embodiments of the invention.

FIG. 6 is a flow diagram of a method 690 of using a change log to rebuild a RAID-1 volume, according to one or more embodiments of the invention. After starting at block 691, the change log may be accessed or otherwise received, at block 692. For example, the change log may be received from a configuration area of a primary (operating) storage device, or from system memory.

Then, a subset of the data of the primary (operating) storage device may be copied to the secondary (awoken) storage device based on the change log, at block 694. For example, software may scan through or otherwise consult or reference the sector bitmap or other change log. While scanning through the change log, if information indicates that data of a portion of a storage device has been changed, then the data may be copied from the primary disk to the secondary disk. For example, if a bit of a sector bitmap has been set, then the data of the sector corresponding to the set bit may be copied. As discussed above, this is just one possible convention, and the scope of the invention is not limited to just this convention. Then, the scan may continue with the next bit of the sector bitmap, until the end of the change log has been reached. The method may end at block 695.

In this way, in one or more embodiments of the invention, re-mirroring or rebuilding of the RAID-1 volume may be performed by selectively copying only a subset of the full set of data, such as, for example, by copying only data which has changed since the previous re-mirroring as reflected in a change log. A potential advantage is faster re-mirroring or rebuilding of the RAID-1 volume than if the full set of data was copied. Representatively, it may take about an hour to copy a 60 gigabyte hard drive if the transfer rate is about a gigabyte-per-minute. In contrast, copying only the data that has changed may take less time, such as, for example, less than several minutes, depending upon how much data has been changed. Such fast re-mirroring or rebuilding of the RAID-1 volume may be advantageous in an environment where mobile computer systems may be transitioned from battery or other DC power to AC power frequently, such as, for example, once a day, or more.

Procedures are also contemplated in the event of an abnormal system event, such as, for example, an abnormal system shutdown due to power failure, or the like. The abnormal system event may potentially occur during operation, or may potentially occur during fast rebuilding of the storage volume. In such events, in accordance with one or more embodiments of the invention, at an appropriate time, such as, for example, on the next reboot, the entire set of data may be mirrored or otherwise used to rebuild the storage volume, rather than just using the changed subset that is recorded as having changed in the change log. Since the change log may potentially be corrupt or otherwise unusable. For example, in the special case of a mirrored storage volume, rather than copying only a subset of the changed data, the entire set of data may be copied from a source to one or more destinations. As another example, a full set of data, rather than a changed subset, may be used to generate parity information that may be stored on one or more other storage devices to rebuild a RAID storage volume that is based on parity information. These are just a few examples and other examples will be apparent to those skilled in the art and having the benefit of the present disclosure. Advantageously, this may allow the storage volume to be rebuilt, and the integrity of the data preserved, even if the system is hindered in properly tracking and logging changes.

Accordingly, in certain embodiments of the invention, a change log may optionally be used to record changes to data and then used to rebuild a storage volume by selectively using data recorded as having changed in the change log. However, the change log is optional and not required. In one or more other embodiments of the invention, a full set of data, rather than just changed data, may optionally be used to rebuild a storage volume whether or not there is an abnormal system event or shutdown.

Now, a very detailed description of particular embodiments of the invention has been provided above. However, the scope of the invention is not limited to the particular embodiments disclosed above. Other embodiments are also contemplated. A few of these other embodiments are disclosed below. Still other embodiments will be apparent to those skilled in the art and having the benefit of the present disclosure.

In one or more embodiments of the invention, a set of storage devices may optionally be managed based not only on whether battery or other DC power is being used to power the mobile computer system, but also on how much battery power is available, or how limited the amount of available power (battery or otherwise) is. For example, a hard disk or other storage device may be put to standby, and changes recorded, when available power drops below a predetermined threshold. The threshold may either be on absolute terms or relative terms, such as, for example, 10%, 25%, 50%, or some other percentage of battery charge remaining.

Multiple graduated levels of data redundancy may optionally be provided, such as, for example, based on multiple predetermined levels of available battery or other DC power. For example, a relatively high level of data redundancy (for example three mirrored sets of data) may be provided when operating on AC power, a medium level of data redundancy may be provided when operating on battery power and available battery power is not less than a threshold (for example two mirrored sets of data), and a relatively low level of data redundancy, including potentially zero data redundancy (for example no mirrored sets of data), may be provided when operating on battery power and the available battery power is less than a threshold.

As another option, in one or more embodiments of the invention, a set of storage devices may be managed based not only on whether battery or other DC power is being used to power the mobile computer system, but also on a selected or specified level of battery or other DC power source conservation. For example, high conservation to provide a comparatively high level of conservation of battery power and comparatively low or no fault tolerance, medium conservation to provide a comparatively medium level of conservation of battery power and medium level of fault tolerance, or no conservation to provide fault tolerance similar to that provided in AC mode without power conservation by reducing power consuming state of storage devices.

As yet another option, in one or more embodiments of the invention, initiation of an increase in a power consuming state of a storage device and causing changes to be made to data on the storage device may optionally be triggered by criteria other than power. Other criteria besides reconnecting to an AC power source may be the trigger.

As one example, such operations may optionally be triggered when a threshold of changes to data has been surpassed. In one aspect, the trigger may be when more than a threshold number of sectors have been changed.

As another example, such operations may optionally be triggered when a predetermined period of time of battery-powered operation or other DC-source powered operation has passed. In various aspects, the trigger may be when one, two, five, or ten hours has passed.

As yet another example, a user may optionally be allowed to manually invoke such operations, such as, for example, through a power management utility. For example, the user may request or instruct the mobile computer system to rebuild the RAID-1 volume. This may offer a potential advantage of allowing a user to manually rebuild a RAID-1 volume, for example, after important changes have been made. A user may also optionally be allowed to use the power management utility to turn off the logic as described herein, if desired.

The operations described above may be performed while the mobile computer system is powered using electricity from the battery, fuel cell, wind-up mechanism, or other non-outlet source, and then the power consuming state of the storage device may optionally be decreased, and changes recorded to the sector bitmap, as previously described.

Raid-1 volumes or mirrors may also optionally be broken for reasons other than power conservation. For example, a mirror may be broken in order to provide protection or backup against software induced data loss. As another example, a mirror may be broken in order to backup the system to a known state at a particular point in time. Such backups may also optionally be taken at different points in time. The system may then optionally be restored by booting to a split off half or other fraction of the RAID volume.

These are just a few options that are contemplated. Other options will be apparent to those skilled in the art and having the benefit of the present disclosure.

Figure 7:
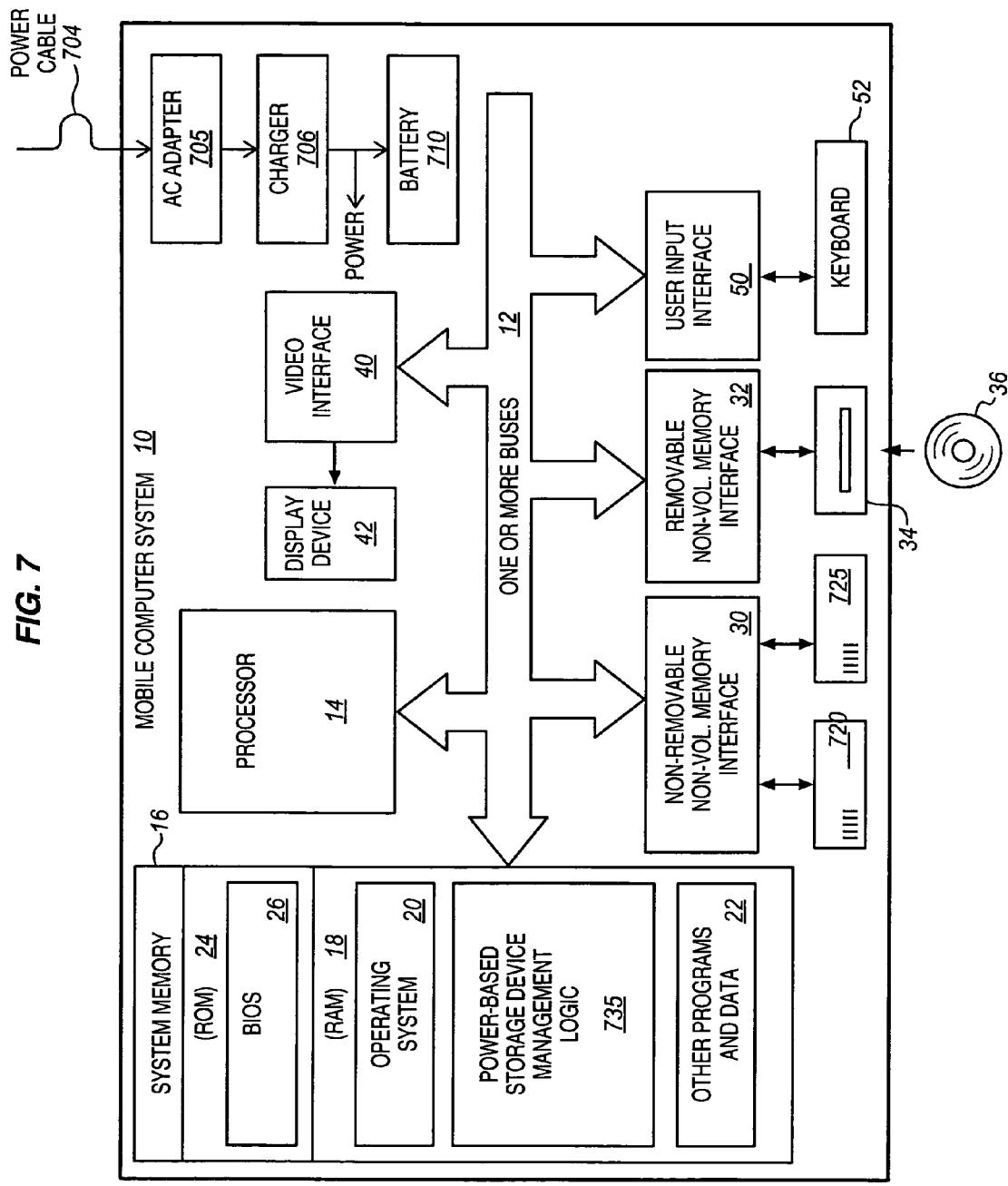
FIG. 7 is a block diagram showing further details of a mobile computer system suitable for implementing one or more embodiments of the invention.

FIG. 7 is a block diagram showing further details of a mobile computer system 10 suitable for implementing one or more embodiments of the invention. As used herein, a "computer system" may include an apparatus having hardware and/or software to process data. The mobile computer system may include, but is not limited to, a laptop computer (also known as a notebook computer), a sub-notebook computer, a desktop/notebook computer, a palmtop computer, or a personal digital assistant, to name just a few examples. The mobile computer system represents one example of a suitable computing environment and is not intended to suggest any limitation as to the scope of use or functionality of the invention. Other mobile computer systems and variations of the illustrated mobile computer system are also possible.

The mobile computer system includes an AC adapter 705, a charger 706, and a battery 710. A power cable 704 may be used to couple the AC adapter with an external AC power source. The AC adapter may provide power to the charger, which may charge the battery. The AC adapter and/or the battery may provide power to the mobile computer system as previously discussed.

The mobile computer system includes one or more buses or other interconnects 12 to communicate information. The one or more buses or other interconnects may include one or more or combinations of various known interconnects including, but not limited to, a memory bus or memory controller, a peripheral bus, and a local bus using any of a variety of bus architectures. By way of example, and not limitation, such architectures include, but are not limited to, Industry Standard Architecture (ISA) bus, Micro Channel Architecture (MCA) bus, Enhanced ISA (EISA) bus, Video Electronics Standards Association (VESA) local bus, Peripheral Component Interconnect (PCI) bus also known as Mezzanine bus, and Universal Serial Bus (USB). In one aspect, a hard disk of a RAID volume may be linked to other components by one or more of such buses, such as, for example, by a USB bus.

The mobile computer system includes a processor 14 coupled with the bus to process information. In one or more embodiments, the processor may include a processor in the Pentium® family of processors, such as, for example, a Pentium® 4 processor. The Pentium® family of processors are commercially available from Intel Corporation, of Santa Clara, Calif. Alternatively, other processors may optionally be used. As one example, a processor having multiple processing cores may be used. As another example, a processor manufactured and/or commercially available from a source other than Intel Corporation may optionally be used. Further, in one or more embodiments, the mobile computer system may include multiple processors.

The mobile computer system further includes a system memory 16 coupled with the one or more buses or other interconnects. As shown, the illustrated system memory may include a main memory, such as, for example, a random access memory (RAM) 18, or other dynamic storage device, to store information including instructions to be executed by the processor. The RAM may store an operating system 20, such as, for example, a power-aware operating system to implement operating system assisted and/or directed power management.

Suitable operating systems include, but are not limited to, Windows®, Unix®, Linux, Solaris, Macintosh, and other operating systems known in the arts. By way of example, suitable Windows-based operating systems include, but are not limited to, Microsoft® Windows® XP Home Edition with SP2, Microsoft® Windows® XP Professional with SP2, and Microsoft® Windows® XP Media Center Edition. The scope of the invention is not limited to any known operating system.

As shown, the RAM may also store power-based storage device management logic 735, according to one or more embodiments of the invention. The logic may include programs, program modules, routines, objects, components, other sequences of instructions, and combinations thereof. The RAM may also optionally store other programs and data 22, as desired. Different types of RAM memory that are included in some, but not all mobile computer systems, include, but are not limited to, static-RAM (SRAM) and dynamic-RAM (DRAM). Other types of RAM that are not necessarily dynamic or need to be refreshed may also optionally be used.

Referring again to FIG. 7, the illustrated system memory may also include a read only memory (ROM) 24 to store static information and instructions for the processor, such as, for example, the basic input-output system (BIOS) 26. The BIOS may include a power aware BIOS. Different types of memory that are included in some, but not all, mobile computer systems include Flash memory, programmable ROM (PROM), erasable-and-programmable ROM (EPROM), and electrically-erasable-and-programmable ROM (EEPROM).

The illustrated mobile computer system includes a non-removable, non-volatile memory interface 30, such as, for example, a hard disk controller, that is coupled with the one or more buses or other interconnects. A first non-removable, non-volatile storage device 720, such as, for example, a first hard disk, and a second non-removable, non-volatile storage device 725, such as, for example, a second hard disk, may be coupled with the memory interface. Other storage devices may also optionally be coupled. As previously discussed, in one or more embodiments of the invention, data may be stored on the set of storage devices according to a fault tolerant or data redundancy protocol, such as, for example, RAID-1.

The illustrated mobile computer system includes a removable, non-volatile memory interface 32 coupled with the one or more buses or other interconnects and its corresponding drive 34 coupled with the interface. As shown in the illustrated embodiment, the drive may include a drive to receive an optical disk 36, such as, for example, a CD-ROM, although the scope of the invention is not so limited.

The mobile computer system further includes a video interface 40 coupled with the one or more buses or other interconnects. The video interface may be coupled with a display device 42, such as, for example, a liquid crystal display (LCD), to display information to a user. In the case of a laptop, the display is often physically coupled with a base having the processor and other components by a hinge, although the scope of the invention is not limited in this respect.

The mobile computer system further includes a user input interface 50 that is coupled with the one or more buses or other interconnects. The user input interface may be coupled with a keyboard 52 or other alphanumeric input device including alphanumeric and other keys. The keyboard may be used to communicate information and command selections to the processor. The keyboard may optionally include a cursor control device to control cursor movement on the display device. In the case of a laptop, the keyboard is often integrated with the base having the processor and other components, although the scope of the invention is not limited in this respect.

The mobile computer system may also optionally include other components. For example, the mobile computer system may optionally include a communication device, such as, for example, a modem, network interface card, or the like, although the scope of the invention is not limited in this respect.

In the description above, for the purposes of explanation, numerous specific details have been set forth in order to provide a thorough understanding of the embodiments of the invention. It will be apparent however, to one skilled in the art, that one or more other embodiments may be practiced without some of these specific details. The particular embodiments described are not provided to limit the invention but to illustrate it. The scope of the invention is not to be determined by the specific examples provided above but only by the claims below. In other instances, well-known circuits, structures, devices, and operations have been shown in block diagram form or without detail in order to avoid obscuring the understanding of the description.

Various operations and methods have been described. Some of the methods have been described in a basic form, but operations may optionally be added to and/or removed from the methods. The operations of the methods may also often optionally be performed in different order. Many modifications and adaptations may be made to the methods and are contemplated.

Certain operations may be performed by hardware components, or may be embodied in machine-executable instructions, that may be used to cause, or at least result in, a circuit programmed with the instructions performing the operations. The circuit may include a general-purpose or special-purpose processor, or logic circuit, to name just a few examples. The operations may also optionally be performed by a combination of hardware and software.

One or more embodiments of the invention may be provided as a program product or other article of manufacture that may include a machine-accessible and/or readable medium having stored thereon one or more instructions and/or data structures. The medium may provide instructions, which, if executed by a machine, may result in and/or cause the machine to perform one or more of the operations or methods disclosed herein. Suitable machines include, but are not limited to, mobile computer systems, processors, logic circuits, and other devices with one or more processors.

The medium may include, a mechanism that provides, for example stores and/or transmits, information in a form that is accessible by the machine. For example, the medium may optionally include recordable and/or non-recordable mediums, such as, for example, floppy diskette, optical storage medium, optical disk, CD-ROM, magnetic disk, magneto-optical disk, read only memory (ROM), programmable ROM (PROM), erasable-and-programmable ROM (EPROM), electrically-erasable-and-programmable ROM (EEPROM), random access memory (RAM), static-RAM (SRAM), dynamic-RAM (DRAM), Flash memory, and combinations thereof.

A medium may also optionally include an electrical, optical, acoustical, radiofrequency, or other form of propagated signal, such as carrier waves, infrared signals, digital signals, for example. One or more embodiments of the invention may be downloaded as a computer program product, wherein the program may be transferred from one machine to another machine by way of data signals embodied in a carrier wave or other propagation signal or medium via a communication link (e.g., a modem or network connection).

For clarity, in the claims, any element that does not explicitly state "means for" performing a specified function, or "step for" performing a specified function, is not to be interpreted as a "means" or "step" clause as specified in 35 U.S.C. Section 112, Paragraph 6. In particular, any potential use of "step of" in the claims herein is not intended to invoke the provisions of 35 U.S.C. Section 112, Paragraph 6.

It should also be appreciated that reference throughout this specification to "one embodiment", "an embodiment", or "one or more embodiments", for example, means that a particular feature may be included in the practice of the invention. Such recitations do not necessarily refer to the same embodiment. Similarly, it should be appreciated that in the description various features are sometimes grouped together in a single embodiment, Figure, or description thereof for the purpose of streamlining the disclosure and aiding in the understanding of various inventive aspects. This method of disclosure, however, is not to be interpreted as reflecting an intention that the invention requires more features than are expressly recited in each claim. Rather, as the following claims reflect, inventive aspects may lie in less than all features of a single disclosed embodiment. Thus, the claims following the Detailed Description are hereby expressly incorporated into this Detailed Description, with each claim standing on its own as a separate embodiment of the invention.

Accordingly, while the invention has been thoroughly described in terms of several embodiments, those skilled in the art will recognize that the invention is not limited to the particular embodiments described, but may be practiced with modification and alteration within the spirit and scope of the appended claims. The description is thus to be regarded as illustrative instead of limiting.

What is claimed is:

1. A method comprising:
   initiating a split of a Redundant Array of Independent (or Inexpensive) Disks (RAID) volume of a mobile computer system after switching from powering the mobile computer system with an alternating current (AC) power source to powering the mobile computer system with a battery, said RAID volume including a first storage device and a second storage device; and
   initiating a reduction of a power consuming state of said first storage device of the RAID volume while on battery power.

2. The method of claim 1, further comprising recording changes that are made to data on said second storage device of the RAID volume in a change log.

3. The method of claim 2, further comprising, after said recording the changes:
   initiating an increase in the power consuming state of the first storage device, and making changes to data stored on the first storage device based at least in part on the changes recorded in the change log.

4. The method of claim 3, wherein said making the changes comprises selectively copying portions of data recorded as having been changed in the change log from the second storage device to the first storage device.

5. A method comprising:
   in response to switching from alternating current (AC) power to battery power, initiating a split of a Redundant Array of Independent (or Inexpensive) Disks level one (RAID-1) volume of a mobile computer system, wherein the RAID-1 volume includes at least a first storage device of the mobile computer system and a second storage device of the mobile computer system;
   recording changes that are made to data of the first storage device in a change log; and
   initiating regeneration of the RAID-1 volume by copying only a subset of the data of the first storage device to the second storage device, wherein the subset includes data of the first storage device that was recorded as having been changed in the change log.

6. The method of claim 5, further comprising:
   initiating a reduction in a power consuming state of the second storage device after said initiating the split; and
   initiating an increase in the power consuming state of the second storage device before said initiating regeneration.

7. The method of claim 5, wherein the change log comprises a bitmap, wherein each bit of the bitmap corresponds to a different portion of the first storage device, and wherein a value of each bit of the bitmap indicates whether or not data on a corresponding portion of the first storage device has been changed.

8. An article of manufacture comprising:
   a machine-accessible medium including at least one of a disk and a memory that provides instructions that if executed result in a machine performing operations including,
   initiating a split of a storage volume of a mobile computer system, the storage volume complying with a fault tolerant storage technology, based at least in part on whether power is provided from an outlet or from a direct current source of power, and
   stopping a disk of a first storage device of the storage volume from spinning after initiating the split, wherein the disk of the first storage device is included within a chassis of the mobile computer system.

9. The article of manufacture of claim 8, wherein the instructions that if executed result in the machine initiating the split further comprise instructions that if executed result in the machine initiating the split in response to decoupling the mobile computer system from an alternating current power source or powering the mobile computer system when the mobile computer system is not coupled with an alternating current power source.

10. The article of manufacture of claim 8, wherein the machine-accessible medium further provides instructions that if executed result in the machine recording changes that are made to data on a second storage device of the storage volume in a data structure.

11. The article of manufacture of claim 10, wherein the machine-accessible medium further provides instructions that if executed result in the machine performing operations including,
   causing the disk of the first storage device to spin, and
   selectively changing data stored on the first storage device based at least in part on the changes recorded in the data structure.

12. The article of manufacture of claim 11, wherein the instructions that if executed result in the machine selectively changing the data further comprise instructions that if executed result in the machine copying only portions of data recorded as having changed in the data structure from the second storage device to the first storage device.

13. A system comprising:
   a bus;
   a processor coupled with the bus;
   a DRAM memory coupled with the bus;
   instructions stored on the DRAM memory that if executed result in the processor performing operations including,
   initiating a split of a storage volume, the storage volume complying with a fault tolerant storage technology, based at least in part on whether power is provided from an alternating current source of power or a direct current source of power, and
   stopping a disk of a first storage device of the storage volume from spinning, wherein the disk of the first storage device is included within a chassis of the system that also includes the processor.

14. The system of claim 13, wherein the instructions that if executed result in the processor initiating the split further comprise instructions that if executed result in the processor initiating the split in response to decoupling the mobile computer system from an alternating current power source or powering the mobile computer system when the mobile computer system is not coupled with an alternating current power source.

15. The system of claim 13, wherein the instructions further comprise instructions that if executed result in the processor recording changes that are made to data on. a second storage device of the storage volume in a data structure.

16. The system of claim 15, wherein the instructions further comprise instructions that if executed result in the processor performing operations including,
    causing the disk of the first storage device to spin, and
    selectively changing data stored on the first storage device based at least in part on the changes recorded in the data structure.

17. The system of claim 16, wherein the instructions that if executed result in the processor selectively changing the data further comprise instructions that if executed result in the processor copying only portions of data recorded as having changed in the data structure from the second storage device to the first storage device.

* * * * *